Figure 1:
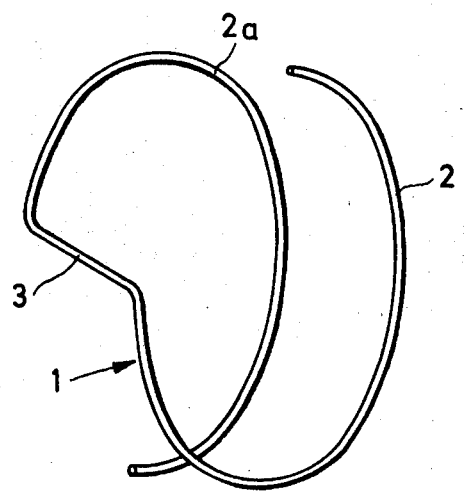

United States Patent

[11] 3,578,784

[72] Inventors Karl Ashauer
 318 Wolfsburg, Rabenhorst 2;
 Dieter Manthey, 318 Wolfsburg, An der
 Kirchmesse 14, Wolfsburg, Germany
[21] Appl. No. 880,120
[22] Filed Nov. 26, 1969
[45] Patented May 18, 1971

[54] SPREADING SPRING FOR SPEED SELECTION AND SYNCHRONIZING DEVICES FOR MOTOR VEHICLES
4 Claims, 3 Drawing Figs.
[52] U.S. Cl. .................................................. 192/53R, 192/53F
[51] Int. Cl. ................................................... F16d 23/02

[50] Field of Search ............................................ 192/53, 53 (A—G)

[56] References Cited
UNITED STATES PATENTS
2,221,900 11/1940 White et al. .................. 192/53F
2,221,901 11/1940 Barr ............................. 192/53F Primary Examiner—Allan D. Herrmann
Attorney—Watson, Cole, Grindle & Watson ABSTRACT: An annular-shaped spreading spring for speed selection and synchronizing devices for motor vehicles consisting of an integral wire with two winding loops interconnected by a crossover sector.

PATENTED MAY 18 1971

3,578,784

INVENTORS
Karl Ashauer
BY Dieter Manthey

Watson, Cole, Grindle + Watson
Attys.

SPREADING SPRING FOR SPEED SELECTION AND SYNCHRONIZING DEVICES FOR MOTOR VEHICLES

This invention relates to an annular-shaped spreading spring particularly for speed selection and synchronization devices of motor vehicles. The device is supported by blocking elements which have been disposed in grooves of clutch gears between the latter and a sliding sleeve and fit against a synchronizing ring.

In the case of speed selection and synchronization devices, the so-called stops which bring about the stopping position of the synchronizing ring as compared to the sliding sleeve, are disposed loosely in the axial grooves interrupting the teeth of the clutch gear, and are pressed against the teeth of the sliding teeth radially by means of springs. It has been known to provide a coil spring for each stop which is supported on the bottom of the groove. This solution is expensive and cumbersome to mount because of the multiplicity of springs. It has also been known to use a circular-shaped spreading spring on each side of the clutch gear, said springs grasping the free ends of the elongated stops all at once. The one end of the spreading springs at the same time has been bent at the outside and has been inserted each time into a stop. Despite this safety measure it does happen that the bent ends jump out of the stops because of the accelerations of the clutch gear. Under certain circumstances the stops can drop out and cause damage to the gearing. It is therefore an object of the invention to improve the holding of the stops in the grooves of the clutch gear and to simplify the means required for this purpose while increasing at the same time its safe functioning.

The invention consists of an annular spreading spring which has a winding lying in parallel planes in relation to one another on each side of the clutch gear, said windings passing over into one another by way of a steep section disposed in one of the grooves for the stops and which have the same circumference as the arc. At the same time the spring may consist of wire. The advantage of the invention is to be seen above all in the fact that a single such spreading spring, will suffice to hold all stops securely in their grooves. The spreading spring with its windings encompasses the clutch gear and is inserted at the same time with its steep sector in one of the grooves so that it cannot slip away either axially or in the direction of the circumference.

Figure 3:
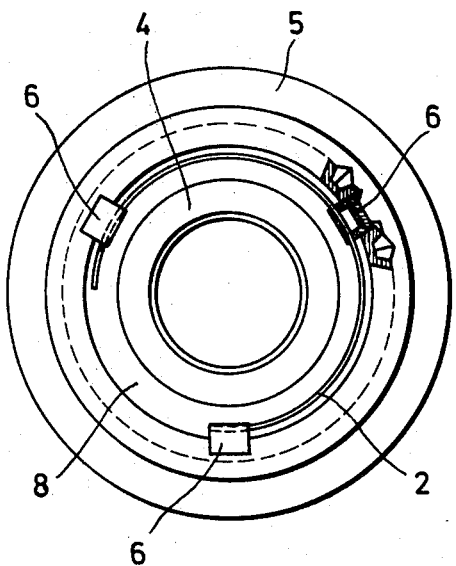
Figure 2:
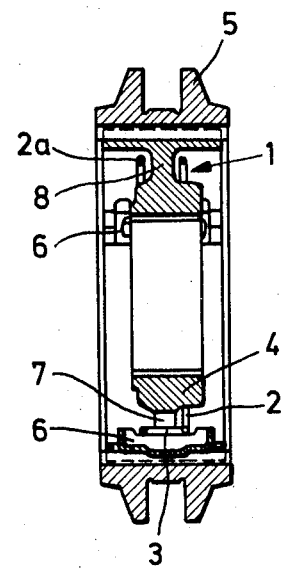

Further objects will be apparent from the following description when considered in connection with the accompanying drawing in which:

FIG. 1 is a perspective view of a spreading spring,
FIG. 2 is a cross section through a part of the speed selection and synchronization device with the inserted spreading spring therein, and
FIG. 3 is a side view of FIG. 2.

Numeral 1 designates an annular-shaped spreading spring composed of a round or square wire which has a circular-shaped winding 2 and 2a each in planes parallel to one another. The windings 2 and 2a have the same circumferential lengths and pass over into one another with a steep sector 3.

In the meshing gear of the system of the clutch gear 4 and of the sliding sleeve 5 of the speed selection and synchronizing device, three elongated stops 6 are provided distributed evenly which are held in axial grooves 7, breaking through the gear rim of the clutch gear 4 and which are supposed to fit under tension against the teeth of the sliding sleeve 5. For that purpose the spreading spring 1 has been disposed in one of the grooves 7 with its steep sector 3. Thus the windings 2 and 2a extend on the left and right of bridge 8 of the clutch gear 4, so that they reach behind the ends of the two stops 6 located in the area of the winding and are capable of spreading them apart. At the same time the spreading spring 1 is supported with sector 3 on the third stop 6 and presses it likewise to the outside.

We claim:

1. Annular-shaped spreading spring particularly for speed selection and synchronizing devices of motor vehicles, said spring disposed in grooves of a clutch gear between the latter and a sliding sleeve, the spring having a winding on each side of the clutch gear which lies in a parallel plane one in relation to the other, and said windings passing over into each other by means of a steep sector arranged in one of the grooves, and which have the same arc circumference.

2. Annular-shaped spreading spring according to claim 1, in which the spring consists of wire.

3. Annular-shaped spreading spring according to claim 1, in which the spring consists of a continuous integral wire.

4. Annular-shaped spreading spring according to claim 1, in which a plurality of stops are provided spaced around the clutch gear.